Jan. 17, 1928.  1,656,316
E. R. BURTNETT
INTERNAL COMBUSTION ENGINE
Filed April 7, 1926   2 Sheets-Sheet 2
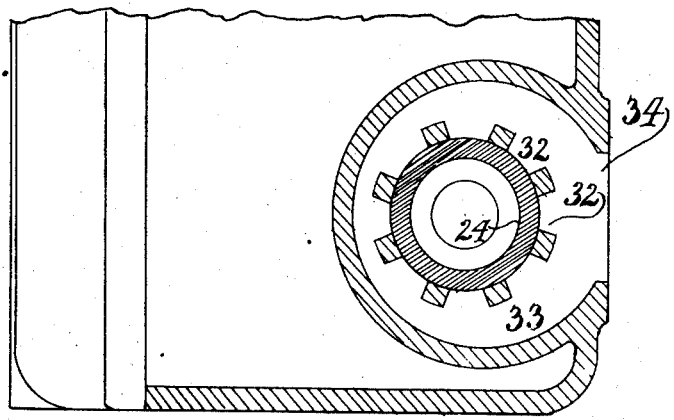
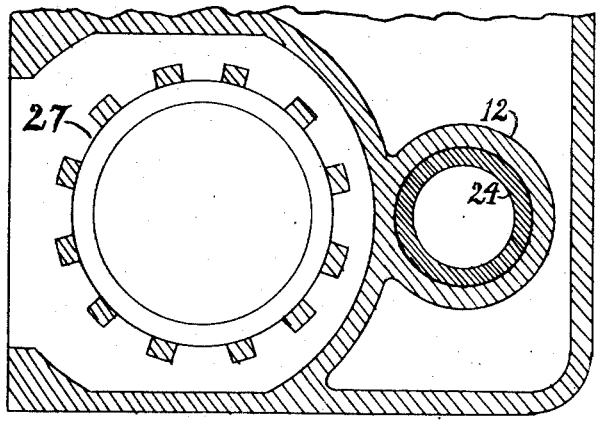
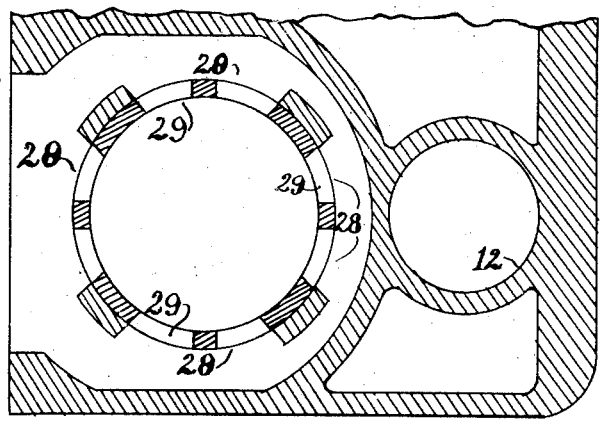
*INVENTOR*
*Everett R Burtnett*

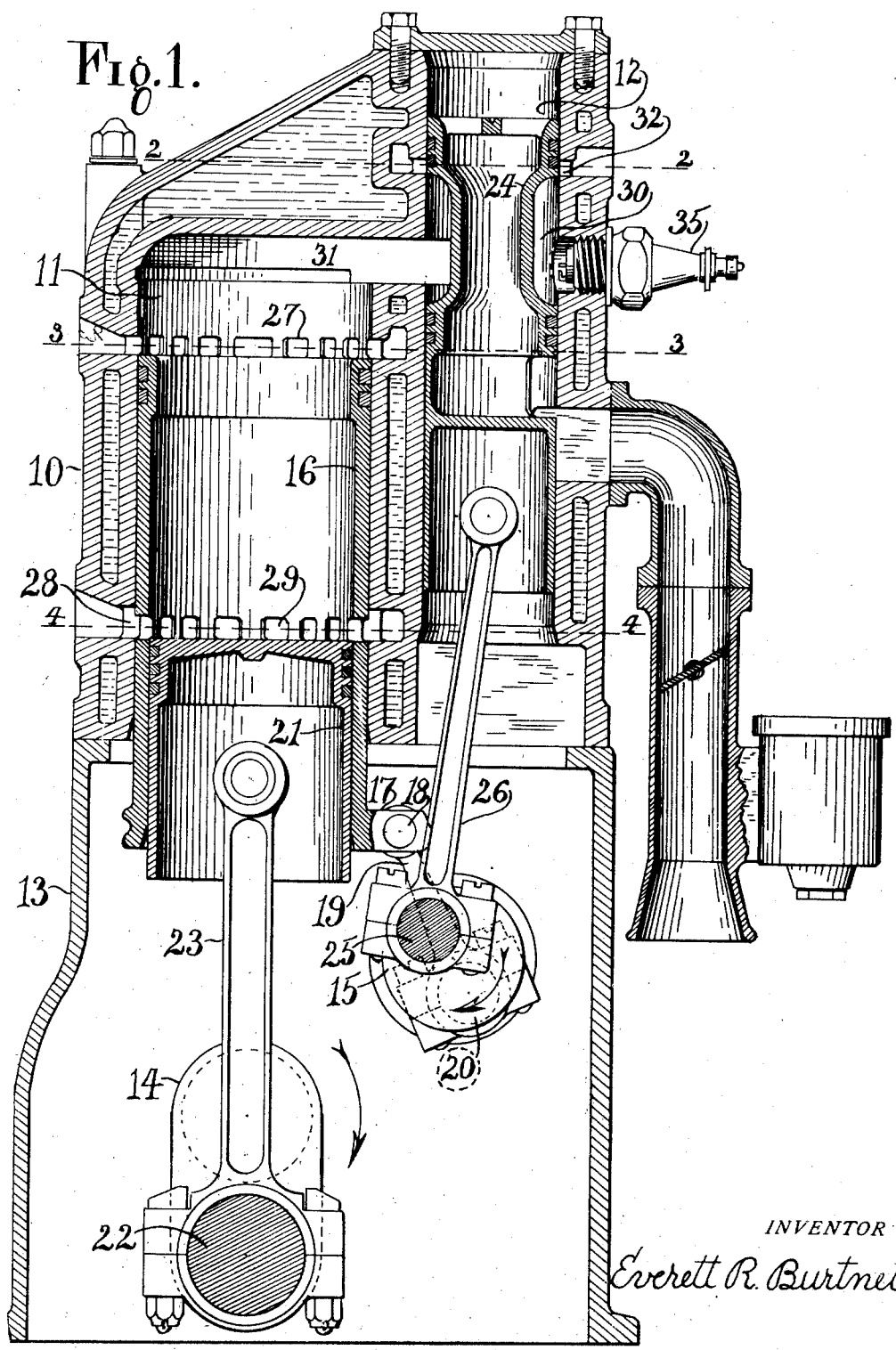

Patented Jan. 17, 1928.

1,656,316

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION.

INTERNAL-COMBUSTION ENGINE.

Application filed April 7, 1926. Serial No. 100,258.

My invention relates to internal combustion engines of the two stroke cycle type, and has for its principal objects, the provision of two valves of different construction related to one combustion cylinder, the operation of which, in reciprocatory movement, will effect a balancing of the respective valve reciprocative forces, also the balance of the rotary mass provided for the actuation of the two valves.

Further objects of my invention are, to provide a sleeve valve arranged for reciprocatory movement within the combustion cylinder, the sleeve valve in conjunction with the power piston within the combustion cylinder facilitating the opening and closing operation, at the desired time, of two series of exhaust ports. Also to provide a second valve to the combustion chamber, formed to the side of the combustion cylinder and arranged for reciprocatory movement within an auxiliary cylinder, the side valve being adapted to the function of fresh charge admission into the combustion chamber.

The combination of a sleeve valve within the combustion cylinder and adapted to the function of exhaust port operation, and of a balanced area side valve adapted to the function of fresh charge admission to the combustion chamber, provides a very efficient valve means to accomplish a very great ratio of super-charging, with extremely effective cooling range and efficient in controlling charge stratification, which is necessary in a two stroke cycle internal combustion engine, if flexibility of operation throughout the load or throttle range is to be accomplished.

With the foregoing and other objects in view, my invention consists in certain novel features of construction and arrangement of parts that will be hereinafter more fully described and claimed and illustrated in the accompanying drawings in which:

Fig. 1 is a vertical cross section taken through the center of a combustion cylinder illustrating a practical embodiment of my improved engine.

Fig. 2 is a horizontal section taken on line 2—2 of Fig. 1.

Fig. 3 is a horizontal section taken on line 3—3 of Fig. 1.

Fig. 4 is a horizontal section taken on line 4—4 of Fig. 1.

Referring by numerals to the accompanying drawings which illustrate a practical embodiment of my invention, 10 designates a cylinder block, a combustion cylinder 11, and an inlet valve cylinder 12, are formed in the cylinder block. Surmounting the cylinder block is a crank case 13, in which is suitably journaled a main crank shaft 14, and a valve drive shaft 15.

Arranged for reciprocatory movement within the combustion cylinder 11 is a sleeve valve 16, a boss 17 is formed at the crank end of the sleeve valve and a wrist pin 18 is fitted thereto, a connecting rod 19 connects the sleeve valve to a crank 20 of the valve drive shaft.

A power piston 21 is arranged for reciprocatory movement within the sleeve valve 16 of the combustion cylinder, the power piston being attached to a crank 22 of the main crank shaft, by a conventional connecting rod 23.

A charge inlet valve 24 is arranged for reciprocatory movement within the valve cylinder 12, and the said charge inlet valve 24 is connected to a crank 25 of the valve drive shaft 15, by a conventional connecting rod 26.

The valve cranks 20 and 25 are disposed relatively 180° apart, rotatively with respect to the valve shaft and are formed adjacent axilly with respect to the axis of the valve shaft. This arrangement of the valve cranks diametrically oppositely disposed, permits the balancing of the primary reciprocative forces developed at the valve shaft by making the sleeve and balanced inlet valve of equal weight, with the same crank throw or of increasing one valve crank throw over the other, to develop the same total moments inches of weight from the reciprocative forces about the axis of the valve drive shaft.

A series of exhaust ports 27, are formed through the wall of the combustion cylinder 11, at a point whereby the said ports will be wholly opened to the combustion chamber, by the top edge of the sleeve valve passing crankward of the said ports, only when the sleeve valve is in a position of crank end dead center.

A second series of exhaust ports 28 are formed through the wall of the combustion cylinder 11, at a point in the plane of the line occupied by the head face of the power piston 21, when the said piston is in a position of crank end dead center. A third series of exhaust ports 29 are formed through the sleeve valve 16, at a point whereby the said ports in the sleeve valve will occupy the same plane as the exhaust ports 28 in the cylinder wall, when the said sleeve valve is in a position of crank end dead center.

The inlet valve 24, is formed as a double skirt structure, with a central hub of less outside diameter than the diameter of the bore of the inlet valve cylinder. This form develops an annular space 30, within the valve cylinder, a clearance space 31, is provided in the combustion cylinder 11, and the said clearance space extends laterally intersecting the chamber of the valve cylinder 12, as developed between the two skirts of the inlet valve 24.

A fourth series of ports 32, are formed through the wall of the inlet valve cylinder 12, at a point headward of the laterally extending combustion chamber clearance 31; an annular duct 33, surrounds the said ports 32, providing a passage communication between the charge supply opening 34, and the said ports are adapted to the purpose of providing passage communication between the source of fresh charge induction force and the combustion chamber and are arranged to be opened by the stroke movement of the inlet valve 24, headwardly, the said ports being wholly opened only when the inlet valve 24 is in a position of head end dead center.

Expansion rings are provided in the periphery of each of the two skirts of the balanced inlet valve 24, to accomplish the sealing function of the combustion chamber, expansion rings are provided in the periphery of the head end of the sleeve valve 16, to accomplish the sealing of the combustion chamber and expansion rings are conventionally arranged in the face of the power piston 21, to seal the inner sleeve wall of the combustion chamber.

A spark plug 35, is threaded into the wall of the combustion clearance chamber, preferably at a point coincident with the lateral extension of the combustion clearance chamber.

The operation of my improved engine in two stroke cycle is as follows:

Assuming the parts to be in the position as shown in the accompanying drawings, the power piston 21 at crank end dead center, the sleeve valve 16 at crank end dead center, and the inlet valve 24 in a position related to the valve crank 25 to which the inlet valve 24 is connected, being approximately 45° before head end dead center. At this moment, the exhaust ports 27 and 29 have been open for a period of time corresponding to the time of rotary movement of the crank shaft for approximately 45°, the spent residual products of combustion have made exit from the chamber to the extent of their own pressure influence; a volume of residual gases at about atmospheric pressure will yet be in the chamber, the inlet ports 32 are on the moment about to be opened by the further headward movement of the inlet valve 24, which will permit the inflow of a compressed volume of fresh charge which may be forced into the combustion chamber by any suitable pumping means as may be desired.

When the cranks 22, 20 and 25 have moved 45° further, the exhaust ports 27 and 29 will be closed, the exhaust ports 27 being covered again by the headward movement of the top edge of the sleeve valve 16 and the exhaust ports 29 being covered again by the headward movement of the head of the power piston 21.

The inlet ports 32 will remain open for the period of time corresponding to 45° of crank movement after the exhaust ports were closed, permitting a very great supercharge of fresh fuel mixture being inducted into the combustion chamber.

When the power piston 21 and the sleeve valve 16 have moved one-half way of their headward stroke, the inlet ports 32 will again be closed and the further movement of the power piston 21 headwardly, will continue the compression of the new charge in the combustion clearance chamber.

When the power piston 21 reaches head end center, a maximum compression pressure will be developed within the combustion clearance chamber 31, and ignition of the charge will occur, developing combustion within the cylinder, the influence of which will again drive the power piston crankwardly through the sleeve to the point previously described.

It will be understood that minor changes in the size, form and construction of the various parts of my improved valve mechanism may be made and substituted for those shown and described without departing from the spirit of the invention, the scope of which is set forth in the appended claims.

I claim as my invention:

1. In an internal combustion engine, the combination in a combustion unit a combustion cylinder, a side valve cylinder, a common compression clearance chamber joining the chambers of the said combustion and side valve cylinders, a sleeve valve arranged for a reciprocatory movement within the combustion cylinder, a power piston arranged for reciprocatory movement within the said sleeve valve, two separate series of exhaust ports formed through the wall of the combustion cylinder, one series of exhaust ports located at the head end and one series of exhaust ports located at the crank end of the respective extremities of the stroke sweep movement of the head of the said power piston, one series of exhaust ports formed in the sleeve valve and adapted to register with the said crankwardly located series of exhaust ports formed through the cylinder wall, the side valve cylinder extending headwardly and crankwardly from the plane of the common compression clearance chamber, a series of fresh charge inlet ports formed through the wall of the headwardly extending end of the side valve cylinder, a fresh charge supply port formed through the wall of the crankwardly extending end of the side valve cylinder, a piston valve arranged for reciprocatory movement within the side valve cylinder, a head formed of the piston valve, the piston valve having an annular groove in and a port through its periphery and a fresh charge supply passage formed through its cylindrical form, and ignition means located in the chamber of the side valve cylinder.

2. In a two stroke cycle internal combustion engine, a combustion firing chamber of two cylinders, two series of exhaust ports formed in two annular rows through the wall of one of the two cylinders, a sleeve valve arranged for a reciprocatory movement within the said one cylinder, a series of exhaust ports formed through the sleeve valve, the sleeve valve being adapted to provide the opening and closing of the two annular rows of exhaust ports formed through the cylinder wall, a power piston arranged for reciprocatory movement within the sleeve valve, a series of inlet ports formed in one annular row through the wall of the other of the two cylinders, a common compression clearance space joining the chambers of the two cylinders, the said annular row of inlet ports being located headward of the said common clearance space, a charge supply port formed through the wall of the cylinder having the said annular row of inlet ports, the said charge supply port being located crankward of the said common clearance space, a piston valve arranged for reciprocatory movement within the said cylinder having the inlet ports, the said piston valve being adapted to provide opening and closing of the said annular row of inlet ports and the said charge supply port, a head formed of the piston valve, an annular groove formed in the periphery of the piston valve a charge supply port and a charge passage formed in the piston valve headward of the said head of the valve, means of actuating the sleeve and piston valves relatively in stroke movement in relation in ratio one to one, and ignition means located in the wall of the cylinder having the inlet ports.

3. The combination in a two stroke cycle internal combustion engine, a cylinder having exhaust ports formed in two planes a cylinder having inlet ports formed in two planes, a sleeve valve arranged within the cylinder having the exhaust ports, a piston arranged within the sleeve valve, a piston valve arranged within the cylinder having the inlet ports, the chambers of the cylinder having the exhaust ports and the cylinder having the inlet ports being joined by a common compression clearance space, a passage formed through the inlet valve, the said passage being adapted to provide a fresh charge communication between the said inlet ports, an annular recess formed in the periphery of the piston valve, the said annular recess adapted to provide a fresh charge passage communication between part of the inlet ports of one cylinder and the chamber between the two cylinders, the sleeve valve being adapted to provide passage communication between the exhaust ports of each of the two planes and the chambers within the two cylinders simultaneously, and ignition means terminating within the chamber of the cylinder having the inlet ports, the said ignition means being located in the cylinder wall at a point at which the annular space of the said annular recess of the piston valve is continuously in communication with.

In testimony whereof, I hereto affix my signature.

EVERETT R. BURTNETT.